United States Patent
Cronin

(10) Patent No.: US 9,516,467 B1
(45) Date of Patent: Dec. 6, 2016

(54) MOBILE DEVICE APPLICATIONS ASSOCIATED WITH GEO-LOCATIONS

(71) Applicant: GrandiOs Technologies, LLC, Wilmington, DE (US)

(72) Inventor: John Cronin, Bonita Springs, FL (US)

(73) Assignee: GRANDIOS TECHNOLOGIES, LLC, Charleston, SC (US)

( * ) Notice: Subject to any disclaimer, the term of this patent is extended or adjusted under 35 U.S.C. 154(b) by 0 days.

(21) Appl. No.: 14/626,848

(22) Filed: Feb. 19, 2015

Related U.S. Application Data

(60) Provisional application No. 62/007,834, filed on Jun. 4, 2014.

(51) Int. Cl.
| | | |
|---|---|---|
| H04W 4/02 | (2009.01) | |
| H04W 4/00 | (2009.01) | |
| G06Q 30/02 | (2012.01) | |

(52) U.S. Cl.
CPC ......... *H04W 4/023* (2013.01); *G06Q 30/0255* (2013.01); *G06Q 30/0261* (2013.01); *H04W 4/003* (2013.01)

(58) Field of Classification Search
CPC .... H04L 67/18; H04L 67/34; H04L 29/06312; H04L 12/5865; H04L 29/08657; H04L 51/20; H04L 12/1845; H04W 4/026; H04W 4/02; H04W 4/001; H04W 4/025; H04W 4/021; H04W 4/003; H04W 4/00; H04W 4/12; H04W 72/048; H04M 1/00
See application file for complete search history.

(56) References Cited

U.S. PATENT DOCUMENTS

| | | | |
|---|---|---|---|
| 7,409,208 B1* | 8/2008 | Clare | G06F 8/61 455/419 |
| 7,769,395 B2 | 8/2010 | Fiatal et al. | |
| 8,285,264 B2 | 10/2012 | Murata | |
| 8,548,735 B2 | 10/2013 | Forstall et al. | |
| 8,583,188 B2 | 11/2013 | Sundaresan et al. | |
| 8,589,667 B2 | 11/2013 | Mujtaba et al. | |
| 8,611,930 B2 | 12/2013 | Louboutin et al. | |
| 8,620,344 B2 | 12/2013 | Huang et al. | |

(Continued)

FOREIGN PATENT DOCUMENTS

WO    WO 2015/187595    12/2015

OTHER PUBLICATIONS

OSXDaily—http://osxdaily.com/2012/10/15/limit-ad-tracking-ios/—Oct. 15, 2012.*

(Continued)

*Primary Examiner* — Meless Zewdu
(74) *Attorney, Agent, or Firm* — Polsinelli LLP

(57) ABSTRACT

Methods and systems for mobile devices are provided for providing mobile applications associated with geo-location. As such, mobile devices may automatically receive geographic location-specific messages when a user device is near a geographic location. In certain instances, geographic-based advertisements, coupons, promotions, etc. may be downloaded to a user device based on user preferences set in the operating system setting of a mobile device when a user device is moved into a perimeter around one or more geographic locations. The user device may also be set to receive or transmit a geographic location-specific message according to a set of preferences set by a user of a mobile electronic device.

20 Claims, 5 Drawing Sheets

(56) References Cited

U.S. PATENT DOCUMENTS

| | | | |
|---|---|---|---|
| 8,626,465 | B2 | 1/2014 | Moore et al. |
| 8,630,216 | B2 | 1/2014 | Deivasigamani et al. |
| 8,660,501 | B2 | 2/2014 | Sanguinetti |
| 8,688,148 | B2 * | 4/2014 | Steenstra ............... H04W 4/02 455/456.5 |
| 8,706,044 | B2 | 4/2014 | Chang et al. |
| 8,724,723 | B2 | 5/2014 | Panicker et al. |
| 8,750,207 | B2 | 6/2014 | Jeong et al. |
| 8,793,094 | B2 | 7/2014 | Tam et al. |
| 8,816,868 | B2 | 8/2014 | Tan et al. |
| 8,831,529 | B2 | 9/2014 | Toh et al. |
| 8,831,655 | B2 | 9/2014 | Burchill et al. |
| 8,836,851 | B2 | 9/2014 | Brunner |
| 8,843,158 | B2 | 9/2014 | Nagaraj |
| 8,849,308 | B2 | 9/2014 | Marti et al. |
| 8,862,060 | B2 | 10/2014 | Mayor |
| 8,873,418 | B2 | 10/2014 | Robinson et al. |
| 8,874,090 | B2 | 10/2014 | Abuan et al. |
| 8,917,632 | B2 | 12/2014 | Zhou et al. |
| 8,934,921 | B2 | 1/2015 | Marti et al. |
| 9,078,098 | B1 | 7/2015 | Cronin |
| 9,369,842 | B2 | 6/2016 | Cronin |
| 2006/0205394 | A1 | 9/2006 | Vesterinen |
| 2006/0270421 | A1 | 11/2006 | Phillips et al. |
| 2007/0116194 | A1 | 5/2007 | Agapi et al. |
| 2007/0214344 | A1 | 9/2007 | Helvick |
| 2007/0219708 | A1 * | 9/2007 | Brasche ................ G01C 21/32 701/457 |
| 2009/0170479 | A1 | 7/2009 | Jarenskog |
| 2010/0159956 | A1 * | 6/2010 | Lee ............................ 455/456.3 |
| 2011/0047510 | A1 | 2/2011 | Yoon |
| 2011/0105150 | A1 * | 5/2011 | Moon .................... H04W 4/001 455/456.3 |
| 2012/0001928 | A1 | 1/2012 | Sheha et al. |
| 2012/0047011 | A1 | 2/2012 | Rippetoe et al. |
| 2012/0307645 | A1 | 12/2012 | Grosman et al. |
| 2012/0310527 | A1 | 12/2012 | Yariv et al. |
| 2012/0329555 | A1 | 12/2012 | Jabara et al. |
| 2013/0143586 | A1 | 6/2013 | Williams et al. |
| 2013/0172013 | A1 | 7/2013 | Dessouky et al. |
| 2013/0178233 | A1 | 7/2013 | McCoy et al. |
| 2013/0231999 | A1 | 9/2013 | Emrich et al. |
| 2013/0273892 | A1 | 10/2013 | Parker |
| 2013/0297422 | A1 | 11/2013 | Hunter et al. |
| 2013/0303192 | A1 | 11/2013 | Louboutin |
| 2013/0317835 | A1 | 11/2013 | Mathew |
| 2013/0326137 | A1 | 12/2013 | Bilange et al. |
| 2013/0328917 | A1 | 12/2013 | Zambetti et al. |
| 2013/0331087 | A1 | 12/2013 | Shoemaker |
| 2013/0331118 | A1 | 12/2013 | Chhabra |
| 2013/0331137 | A1 | 12/2013 | Burchill |
| 2013/0332108 | A1 | 12/2013 | Patel |
| 2013/0332156 | A1 | 12/2013 | Tackin |
| 2013/0332172 | A1 | 12/2013 | Prakash et al. |
| 2014/0062773 | A1 | 3/2014 | MacGougan |
| 2014/0065962 | A1 | 3/2014 | Le |
| 2014/0066090 | A1 | 3/2014 | Henderson |
| 2014/0071221 | A1 | 3/2014 | Dave |
| 2014/0105084 | A1 | 4/2014 | Chhabra |
| 2014/0139380 | A1 | 5/2014 | Ouyang |
| 2014/0141803 | A1 | 5/2014 | Marti |
| 2014/0162628 | A1 | 6/2014 | Bevelacqua |
| 2014/0167794 | A1 | 6/2014 | Nath |
| 2014/0168170 | A1 | 6/2014 | Lazarescu |
| 2014/0171013 | A1 | 6/2014 | Varoglu et al. |
| 2014/0171099 | A1 | 6/2014 | Sydir et al. |
| 2014/0171114 | A1 | 6/2014 | Marti |
| 2014/0180820 | A1 | 6/2014 | Louboutin |
| 2014/0188636 | A1 | 7/2014 | Vandyke et al. |
| 2014/0191979 | A1 | 7/2014 | Tsudik |
| 2014/0200053 | A1 | 7/2014 | Balasubramanian |
| 2014/0222335 | A1 | 8/2014 | Piemonte |
| 2014/0232633 | A1 | 8/2014 | Shultz |
| 2014/0232634 | A1 | 8/2014 | Piemonte |
| 2014/0247279 | A1 | 9/2014 | Nicholas |
| 2014/0247280 | A1 | 9/2014 | Nicholas |
| 2014/0269562 | A1 | 9/2014 | Burchill |
| 2014/0274150 | A1 | 9/2014 | Marti |
| 2014/0283135 | A1 | 9/2014 | Shepherd |
| 2014/0293959 | A1 | 10/2014 | Singh |
| 2014/0364089 | A1 | 12/2014 | Lienhart |
| 2014/0364148 | A1 | 12/2014 | Block |
| 2014/0365120 | A1 | 12/2014 | Vulcano |
| 2015/0011242 | A1 | 1/2015 | Nagaraj |
| 2015/0026623 | A1 | 1/2015 | Horne |
| 2015/0031397 | A1 | 1/2015 | Jouaux |
| 2015/0358775 | A1 | 12/2015 | Cronin |

OTHER PUBLICATIONS

Mobile Commerce Daily (http://www.mobilecommercedaily.com/location-based-mobile-coupons-take-center-stage-for-holiday-loyalty-building—Sep. 23, 2013).*
OSXDaily (http://osxdaily.com/2012/10/15/limit-ad-tracking-ios/—Oct. 15, 2012).*
"Flash Player Settings Help", Adobe Flash Player, Date of download: Feb. 19, 2014.
GeoMoby—Location & Context Aware Services, Real-Time GeoFencing and Highly Targeted Messaging for Businesses, Date of download: Dec. 6, 2013.
"Launch Center Pro on the App Store on iTunes" by Contrast. Date of download: Feb. 19, 2014.
Save the Elephants—Elephant Geofencing, Date of download: Dec. 8, 2013 http://www.savetheelephants.org/research-reader/items/elephants . . . .
Sayta, Ana; "How to create advanced actions in Launch Center Pro for iPhone and iPad",Periscope Post, Feb. 19, 2014.
U.S. Appl. No. 14/748,908, filed Jun. 24, 2015, John Cronin, Geo-Fencing Based Functions.
U.S. Appl. No. 14/628,087 Office Action mailed Apr. 14, 2015.
PCT/US15/33616, Geo-Fencing Based Functions, Jun. 1, 2015.
U.S. Appl. No. 14/628,087, filed Feb. 20, 2015, John Cronin, Settings Management.
U.S. Appl. No. 14/748,908 Office Action mailed Oct. 23, 2015.
U.S. Appl. No. 14/628,087 Final Office Action mailed Oct. 21, 2015.
U.S. Appl. No. 14/628,087 Office Action mailed May 13, 2016.
PCT Application No. PCT/US2015/033616 International Search Report and Written Opinion mailed Aug. 14, 2015.
U.S. Appl. No. 15/155,499, filed May 16, 2016, John Cronin, Geo-Fencing Based Functions.

* cited by examiner

MOBILE DEVICE APPLICATIONS ASSOCIATED WITH GEO-LOCATIONS

CROSS-REFERENCE TO RELATED APPLICATIONS

The present application claims the priority benefit of U.S. provisional application No. 62/007,834 filed Jun. 4, 2014 and entitled "Mobile Device Applications Associated with Geo-Locations", the disclosure of which is incorporated herein by reference.

BACKGROUND OF THE INVENTION

1. Field of the Invention

The disclosed invention relates to software applications that run on mobile devices. More specifically, the present invention relates to systems and methods of enabling mobile device applications.

2. Description of the Related Art

The term "app" is a commonly-used abbreviation of the term "application software." In many contexts, "app" is also commonly-used to refer specifically to mobile applications. Mobile applications (or "mobile apps") are application software designed to run on smartphones, tablet computers (including electronic reading devices or e-readers), and other mobile devices. Apps may be made available by application developers through application distribution platforms, many of which are typically operated by the owner of the mobile operating system, such as the Apple® App Store℠, Google Play™, Windows® Store, and BlackBerry® App World™. Some apps are available for free, while others must be bought. Usually, such apps are downloaded from the platform to a target device, such as an iPhone®, BlackBerry®, Android®, or Windows® phone, other mobile device, laptop, or desktop computer.

Mobile apps were originally offered for general productivity and information retrieval, including email, calendar, contacts, stock market, and weather information. However, public demand and the availability of developer tools drove rapid expansion into other categories, such as mobile games, factory automation, GPS, and location-based services, banking, order-tracking, and ticket purchases. The explosion in number and variety of apps made discovery a challenge, which in turn led to the creation of a wide range of review, recommendation, and curation sources, including blogs, magazines, and dedicated online app-discovery services.

Given the extraordinary number of apps available, a user may have great difficulty in determining which apps which he or she would find useful or interesting. A customer may be unaware of an app, or may find conventional methods of searching or browsing app stores inadequate, uninformative, untrustworthy, or otherwise unable to identify apps of interest in a timely manner (e.g., when the user may have need for the app). Moreover, there currently exists no way for an application provider to offer discounted or free applications to customers while in a physical geo-location associated with that application.

There is, therefore, a need in the art for improved systems and methods for providing mobile applications associated with geo-location.

SUMMARY OF THE CLAIMED INVENTION

Embodiments of the present invention relates to methods and systems for providing mobile applications associated with geo-location. A mobile device may automatically receive geographic location-specific messages when the mobile device is detected as being located near a defined geographic location. In certain instances, geographic based advertisements, coupons, promotions may be downloaded to a user device based on user preferences set in the operating system setting of a mobile device when a user device is moved into a perimeter around one or more geographic locations. In other instances, interactive applications may be downloaded to a user device. In addition, a mobile device may be set to transmit a geographic location-specific message according to a set of preferences set by its user.

Various embodiments of the present invention include methods for providing mobile applications associated with geo-location. Such methods may include receiving a transmission by a mobile electronic device. In certain instances, this transmission may include content that is associated with the location of the mobile electronic device. The method may further include displaying a message from the transmission on a display of the mobile electronic device.

DETAILED DESCRIPTION

Embodiments of the present invention relates to methods and systems for providing mobile applications associated with geo-location. A mobile device may automatically receive geographic location-specific messages when the mobile device is detected as being located near a defined geographic location. In certain instances, geographic based advertisements, coupons, promotions may be downloaded to a user device based on user preferences set in the operating system setting of a mobile device when a user device is moved into a perimeter around one or more geographic locations. In other instances, interactive applications may be downloaded to a user device. In addition, a mobile device may be set to transmit a geographic location-specific message according to a set of preferences set by its user.

Figure 1:
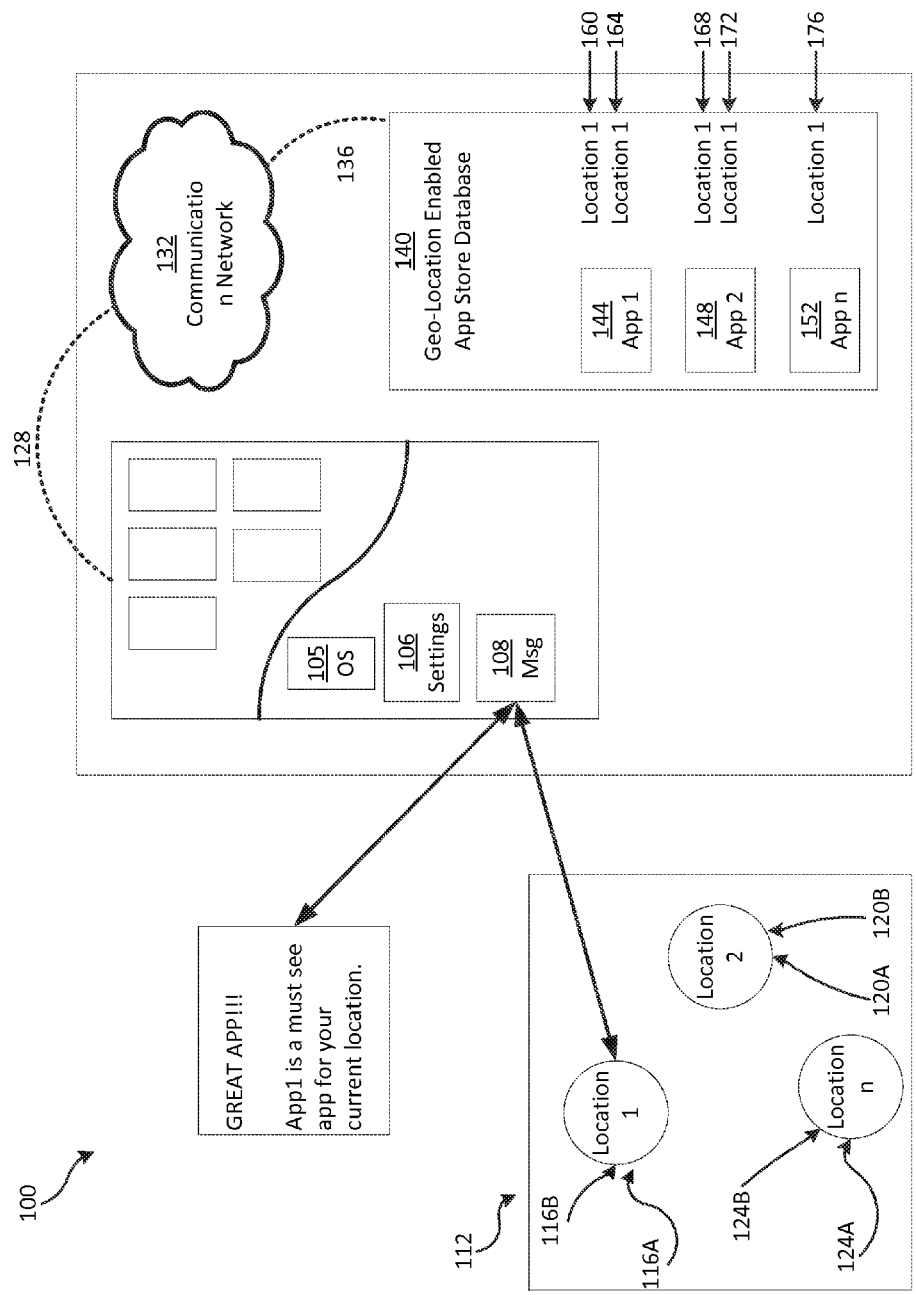
FIG. 1 illustrates an exemplary network environment in which a system for providing mobile applications associated with geo-location may be implemented.

FIG. 1 illustrates an exemplary network environment 100 in which a system for providing mobile applications associated with geo-location may be implemented. Network environment 100 may include a user device communicating via communication network 132 with a geo-location enabled app stored database 140. Map 112 illustrates that when the user device is in a defined location (e.g., Location 1), an application may be activated.

The user device may include operating system 105, operating system settings 106, and a messaging application 108. Users may use any number of different electronic user devices, such as mobile phones, smartphones, personal digital assistants (PDAs), portable computing devices (e.g., laptop, netbook, tablets), handheld computing device, or any other type of computing device capable of communicating over communication network 132. User devices may also be configured to access data from other storage media, such as memory cards or disk drives as may be appropriate in the case of downloaded services. User device may include standard hardware computing components such as network and media interfaces, non-transitory computer-readable storage (memory), and processors for executing instructions that may be stored in memory.

Operating system (OS) 105 is a collection of software that manages computer hardware resources and provides common services for computer programs, including messaging application 108. The operating system 105 is an essential component of the system software in a computer system. Applications, such as messaging application 108, are usually developed for a specific operation system 105 and therefore rely on the associated operating system 105 to perform its functions. For hardware functions such as input and output and memory allocation, the operating system 105 acts as an intermediary between application 108 and the computer hardware. Although application code is usually executed directly by the hardware, applications 108 may frequently make a system call to an OS function or be interrupted by it. Operating systems 105 can be found on almost any device with computing or processing ability. Examples of popular modern operating systems include Android, BSD, iOS, Linux, OS X, QNX, Microsoft Windows, Windows Phone, and IBM z/OS. Most of these (except Windows, Windows Phone and z/OS) may share roots in UNIX.

Operating system settings 106 may be a software function that opens a display that lists OS functions that may be generated upon selection of a user interface button. Such a list of OS functions may be associated with various options that allow the user to designate certain preferences or settings with respect to how certain operating system functions are performed (e.g., display preferences, wireless network preferences, information sharing, accessibility of applications to system information, such as GPS/location, notifications). Once these settings 106 are set, the operating system 105 uses the settings to perform various functions, which includes functions related to execution of an application 108.

A user device may include any number of applications (e.g., application 108), which may include any number of software applications that are native applications (e.g., Notes, Messages, Camera, FaceTime, Weather, etc. on iPhone) or downloaded (e.g., Facebook®, Twitter®, Instagram®). Many applications have a messaging component. Messaging application 108 may therefore include any application that has the ability to send, receive, and display messages. Messaging application 108 displays messages received by the user device, including those messages sent when mobile device is near a geo-location or within a geo-fence.

Map 112 is a representation of a geographical area or region used to plan or review the association of applications to geo-locations. The locations depicted in map 112 are a first location 116A, a second location 120A, and an nth location 124A. Map 112 also shows first geo-fence 116B. A geo-fence may be an area within a perimeter around a specific geo-location. Geo-fence 116B is a geo-fence around a first location 116A; geo-fence 120B is a geo-fence around a second location 120A; and geo-fence 124B is a geo-fence around an nth area 124A. Useful proximities corresponding to a particular geo-location may be created by series of coordinates, be determined by a reception range from a central antenna, or be related to a GPS coordinate.

In certain instances, each location may be a place of interest to a mobile device user. For example, a location may be an historic neighborhood, a monument, an exhibit, a music venue, or a place of business. As such, the user may download apps (e.g., apps 144-152) from geo-location enabled app stored database 140 that offer functionalities specific to such geolocations. App 1 144, for example, may be associated with a set of actions for locations 160-164 identified within defined location 1. When the user device is identified as being within a certain range of location 1 116A, a message or notification (e.g., "GREAT APP!!! App 1 is a must see app for your current location.") may be sent to the user device that recommends the download or purchase of App 1. Furthermore, applications downloaded by a system consistent with an embodiment of the invention may include an interactive map of the geo-location where a user device is located.

Cloud communication network 132 includes a communication network used for passing voice and data information to and between mobile devices. Various forms of data communication networks or connections may be used in embodiments of the invention. Data communication networks or connections that may be used in embodiments of the invention include, yet are not limited to Wi-Fi, cellular, Bluetooth, wireless USB, wireless local area networks, other radio networks, Ethernet, fiber optic, other cable based networks, or by telephone. In certain instances data communication networks include computer networks, the Internet, TCP/IP networks, a wide area network (WAN), or a local area network (LAN).

Wireless data link 128 is a data communication network link that is communicating between mobile device 104 and the cloud 132. Network link 136 is a data communication network path used for communicating information from geo-location enabled application (App) store 140 to or through the cloud. Examples of network link 136 include, yet are not limited to computer networks, data networks, microwave links, satellite links, fiber optic links, telephone systems, cable television systems, or a power line capable of communicating digital information.

Geo-location enabled application store 140 is a service provider that provides applications that are available for download by mobile device 104. Examples of geo-location enabled application stores 140 include telecommunication companies, phone manufacturers, gaming companies, online shopping stores, operating system software companies, or a department store. Examples of specific online shopping stores include and may be iStore, Google Play, Windows Phone Store, and Amazon Appstore. Geo-location enabled application store 140 may include or be associated with any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Alternatively, different functionalities may be allocated among multiple servers, which may be located remotely from each other and communicate over the cloud. Any of the aforementioned servers (or an integrated server) may take on certain client-side, cache, or proxy server characteristics. These characteristics may depend on the particular network placement of the server or certain configurations of the server.

First application 144, second application 148, nth application 152 may be any type of software applications operable on mobile devices. In certain instances, these applications may be used for communication, organization, data creation, gaming, audio-visual presentations, entertainment, or for providing advertisements. Examples of specific applications that may be run on mobile devices include the Hassle Me calendar, the Anki learning tool, Waze traffic news, or the Ballagio vacation application. Applications consistent with the invention may include any type of content like a simple message or an interactive map.

Locations 160-164 may correspond to geo-locations location 1 116A and location 2 120A that are associated with first application 144. Locations 168-172 may correspond to a third geo-location (location 3), and a fourth geo-location (location 4). Geo-locations 3 and 4 may be associated with the second application 148. Location 176 may be a geo-location (location n) that corresponds to geo-location n 124A that is associated with an nth application 152.

In certain instances, settings 106 may be configured to accept communications from applications 144-152 upon entering a geo-fence. As a user moves about, their geo-location information may be sent through cloud communication network 132 via wireless data link 128 to the geo-locations enabled app store database 140 via network link 136. A database in the geo-locations enabled application store 140 may then map applications 144-152 to locations 160-176 that correspond to geo-location 116A. Once a user crosses a boundary, or geo-fence associated with a geo-location (e.g., geo-location 116A), the geo-location enabled application store 140 may send a message via network links 128-136 and cloud communication network 132. Upon receiving the message in the message window 108, a user may decide to download the recommended application (e.g., or a location-specific coupon) that can be used at a venue or vendor near the current location of the mobile device.

Figure 2:
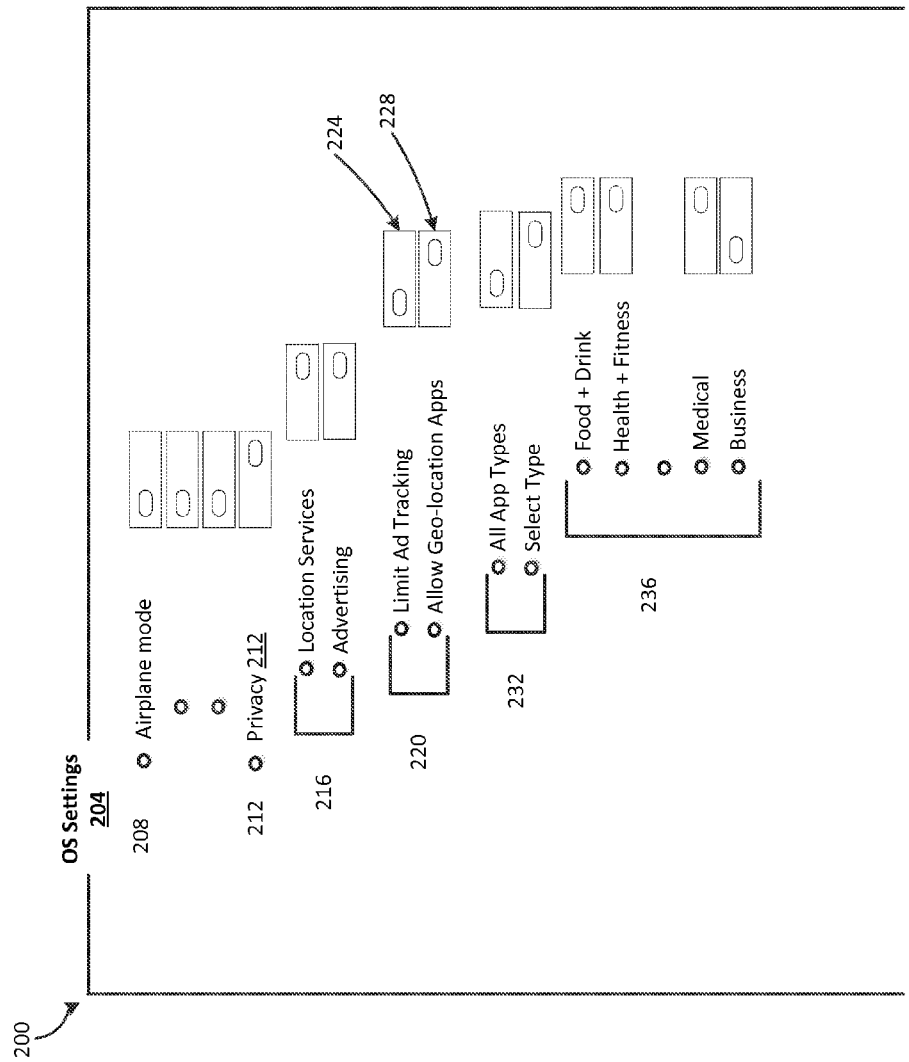
FIG. 2 is a diagram illustrating exemplary settings of an operating system on a mobile device that may be used with a system for providing mobile applications associated with geo-location.

FIG. 2 is a diagram illustrating exemplary settings 200 of an operating system on a mobile device that may be used with a system for providing mobile applications associated with geo-location. Settings 200 may include operating system settings 204, airplane mode 208, known privacy settings 216, advertising sub-menu 220, limit ad tracking 224, allow geo-location tracking 220, geo-location application settings 232, and a subcategories menu 236. Switch position 224 may indicate that the associated setting feature is currently enabled, while switch position 228 may indicate that the associated setting feature is currently disabled. Each switch may be changed between the switch positions 224 and 228 using, inter alia, a touchscreen of the user device.

Airplane mode 208 is a known mobile device operating system mode used for disabling radio frequency functions, while still allowing other productivity and gaming functions to operate on the mobile device. Privacy 212 is a mobile device operating system setting used to protect data, usage information, location information, or to turn GPS functions ON/OFF on a mobile device. Privacy 212 may be associated with privacy sub-menu 216 that enable or disable location services or advertisements. In certain instances, when location services or advertising is enabled on a user device the user device may be configured to receive location alerts or advertisements from the cloud.

Advertising sub-menu 220 may be a settings menu that includes options for limit ad tracking 224 and allow geo-location applications 228. Limit ad tracking protects a user's privacy by allowing a user to block internet browsing information from being provided to advertising companies. Allow geo-location applications may be a type of settings menu used for enabling or disabling the downloading of messages, applications, promotions, or coupons when a user device enters a geo-fence.

Allow geo-location application sub-menu 232 may enable a user to select which type of apps may be allowed to send messages (e.g., all application types or selected types). The user may, for example, allow for selected categories of apps to send messages. Such categories 236 may include food & drink, health & fitness, medical, business, or other categories of apps known in the art. When all application types is enabled, a user device will download all communications relating to any geo-location where the device is detected. When the select types option is enabled, a user device may download only certain specific types of geo-location communications relating to the nearby geo-location.

Figure 3:
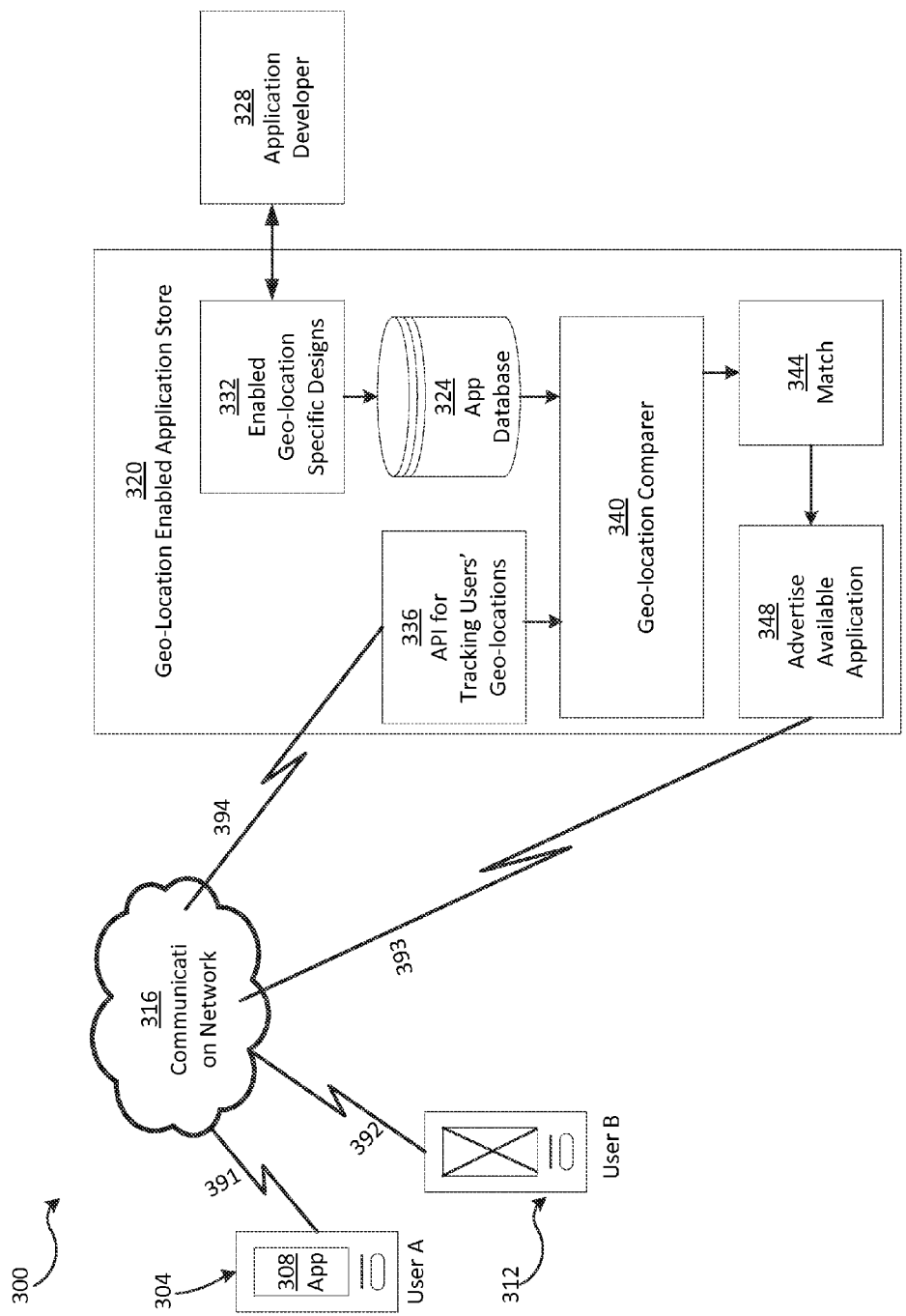
FIG. 3 illustrates an alternative network environment in which a system for providing mobile applications associated with geo-location may be provided.

FIG. 3 illustrates an alternative network environment 300 in which a system for providing mobile applications associated with geo-location may be provided. Network environment 300 includes user device 304 belonging to user A, user device 312 belonging to user B, cloud communication network 316, wireless data communication paths 391-394, and a geo-location enabled application store 320, and application developer 328.

Mobile devices 304 and 312 may generally correspond to the user device discussed in respect to FIG. 1. Likewise, cloud communication network 316 may correspond to cloud communication network 132, and communication paths or channels 391-394 may be any type of network connections used for communicating information. In certain instances, these network connections may be a computer network, a data network, a microwave link, a satellite links, fiber optic links, telephone systems, cable television systems, or a power line configured to transmit digital data. Geo-location enabled app store 320 may similarly correspond to geo-location enabled app store 140.

Illustrated here in greater detail, geo-location enabled application store 320 may include application database 324, enable geo-location specific designs 332, API for tracking user's geo-locations 336, geo-location comparer 340, match module 344, and advertise available application 348.

Application database 324 may include any type of database known in the art for storing data. Application database 324 may store applications that are available for download by mobile devices when the mobile devices are identified as being located in geo-locations associated with the application. For example, a local park may provide an app for download when the mobile device is within a certain range of the local park.

API for tracking user geo-locations 336 may be an application program interface module running on a server associated with the geo-location enabled application store 320. Such an application server may be operable to track the movement of a user's mobile device as it is moved from one geo-location to another (e.g., using GPS or other location coordinates). In certain instances, the location of mobile device 304 may be determined based on its connection to a known Wi-Fi hotspot, a cellular tower, or a combination of other location-tracking technologies. In certain instances, a geo-fence may be surrounded by a plurality of RFID readers or scanners that sense when a smartphone enters any one of a plurality of entrances that describe the perimeter of a geo-fence.

Geo-location comparer 340 may be a software module associated with geo-location enabled application store 320 that is operable to compare the location of user device 304 to locations associated with a geo-location enabled application. As user device 304 moves, its location may be sent to geo-location comparer 340 for comparison to geo-locations associated with any of the applications in geo-location enabled application store 320.

Match 344 may be a software module associated with geo-location enabled application store 320 and may be operable to match the location of a mobile device to a geo-location application. In certain instances, match 344 compares a location from the geo-location comparer 340 using the type settings set in the mobile device. For example, the location of user device 304 may be determined. Data regarding the location and preference settings from user device 304 may be sent to geo-location enabled application store 320, where geo-location comparer 340 and match 344 may operate in conjunction to identify that a preferred type of application is associated with the current location of the user device 304 (e.g., by a geo-fence).

Advertise available application 348 may send user device 304 a targeted message when such conditions are met. Alternatively, advertise available application 348 may broadcast geo-location messages to all user devices that are within a geo-fence. In such instances, user device 304 may block types of geo-location based communications from being downloaded to user device 304 according to geo-location settings set by user A.

Application developer 328 may be a developer of one or more applications available from geo-location enabled application store 320. Application developer 328 may also receive reports with other information regarding their applications, such as vendor information, user preferences, number of downloads, specific geo-locations where downloads occurred, etc. Enable geo-location specific designs 332 is a module in the Geo-location enabled Application Store that is operable to enable one or more application developers to provide applications associated with specific geo-locations.

In operation, application developer 328 may create and load an application to application database 324 via enable geo-location specific designs 332, which enables the geo-location service. User device 304, when located within a geo-fence, may send its location via the cloud 316 to application store 320. Geo-location application store 320 may then send the location of mobile device 304 to the API for tracking user's geo-location 336. User device 312, when it is not located within a geo-fence, similarly may send its location API for tracking user's geo-location 336. Geo-location comparer 340 may compare the geo-location mobile device 304 and mobile device 312 to locations stored in app database 324. When it is determined that mobile device 304 is within a geo-fence and that mobile device 304 is associated with a preference for health & fitness apps, the match module 344 may inform the advertise available application 348 of the match, which may then to be sent to mobile device 304. User device 312 receives no advertisement, because it is not located within a geo-fence.

Figure 4:
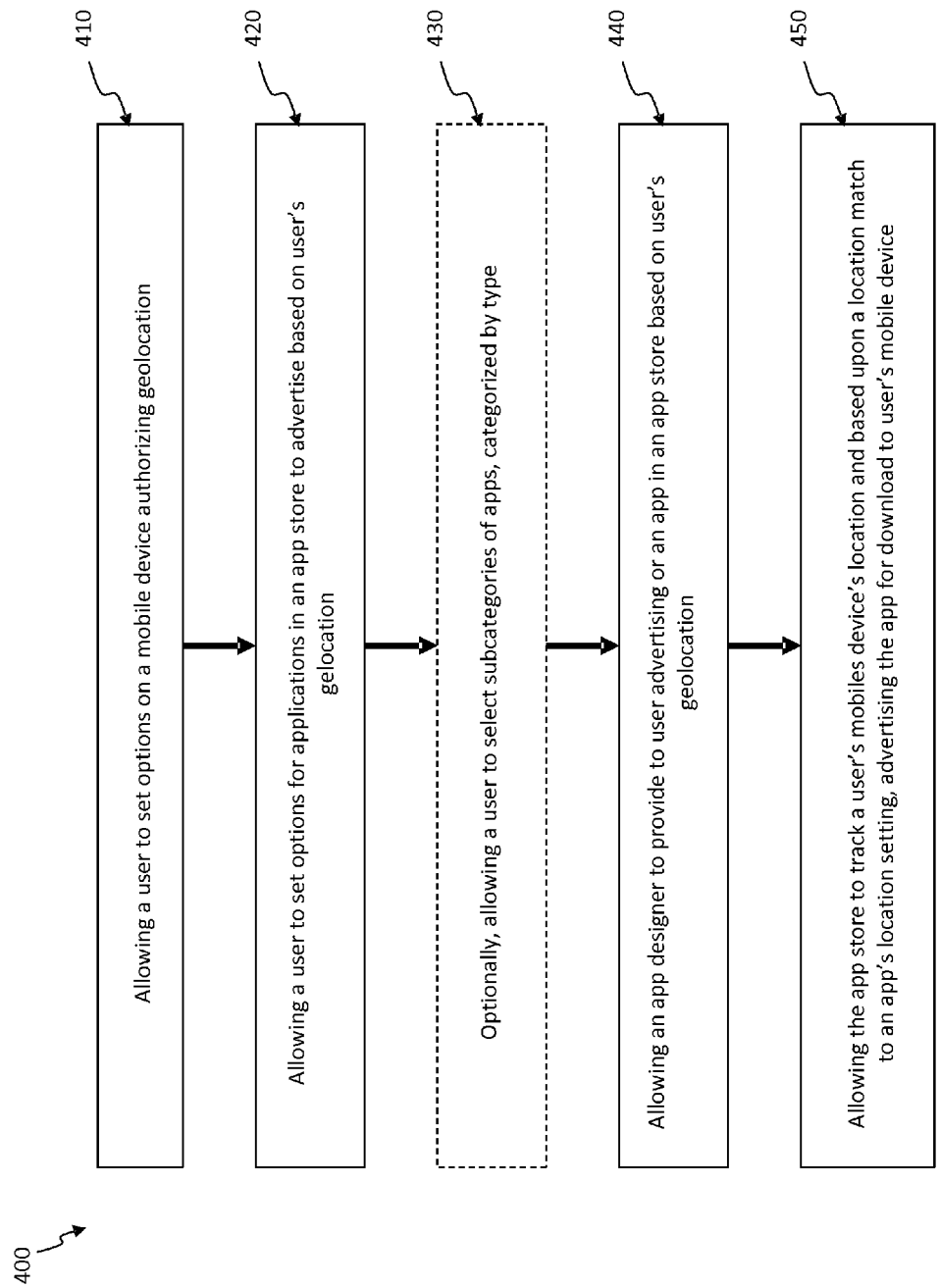
FIG. 4 is a flowchart illustrating an exemplary method for providing mobile applications associated with geo-location.

FIG. 4 is a flowchart illustrating an exemplary method 400 for providing mobile applications associated with geo-location. In step 410, a user may be allowed to set options on a mobile device. Such options may authorize geo-location functions for operation on or with a mobile device. As such, one or more geo-location functions may be enabled on a user device.

In step 420, the user may set or change options allowing an application store to send advertisements to the user device based on its geo-location. Such options may be selected based on the particular preferences of the user. In certain instances, these settings include one or more operating system settings in the user device.

In step 430, the user may select subcategories of applications that are of interest. In certain instances, the user may use predefined categories or subcategories to define and refine a set of user preferences regarding applications. The user may also, however, designate certain keywords or phrases of interest, preferred application developers, and any other parameter that may be used to characterize an application.

In step 440, an application designer may provide various applications associated with geo-locations to an app store. Each application may be associated with a set of one or more locations. For example, a national parks application may be associated with the locations of every national park. Such locations may be defined by coordinates, a range or distances from such coordinates, geo-location paths and routes, or geo-fencing boundaries.

In step 450, the application store may receive information indicative of the location of the mobile device. The mobile device may determine its location (e.g., via GPS) and communicate the such information to an app store with geo-location enabled apps. The app store may identify matches between the current geo-location of the mobile device, user preference, and the geo-location associated with one or more identified applications. The app store may then send a message to the user device recommending the identified applications.

Figure 5:
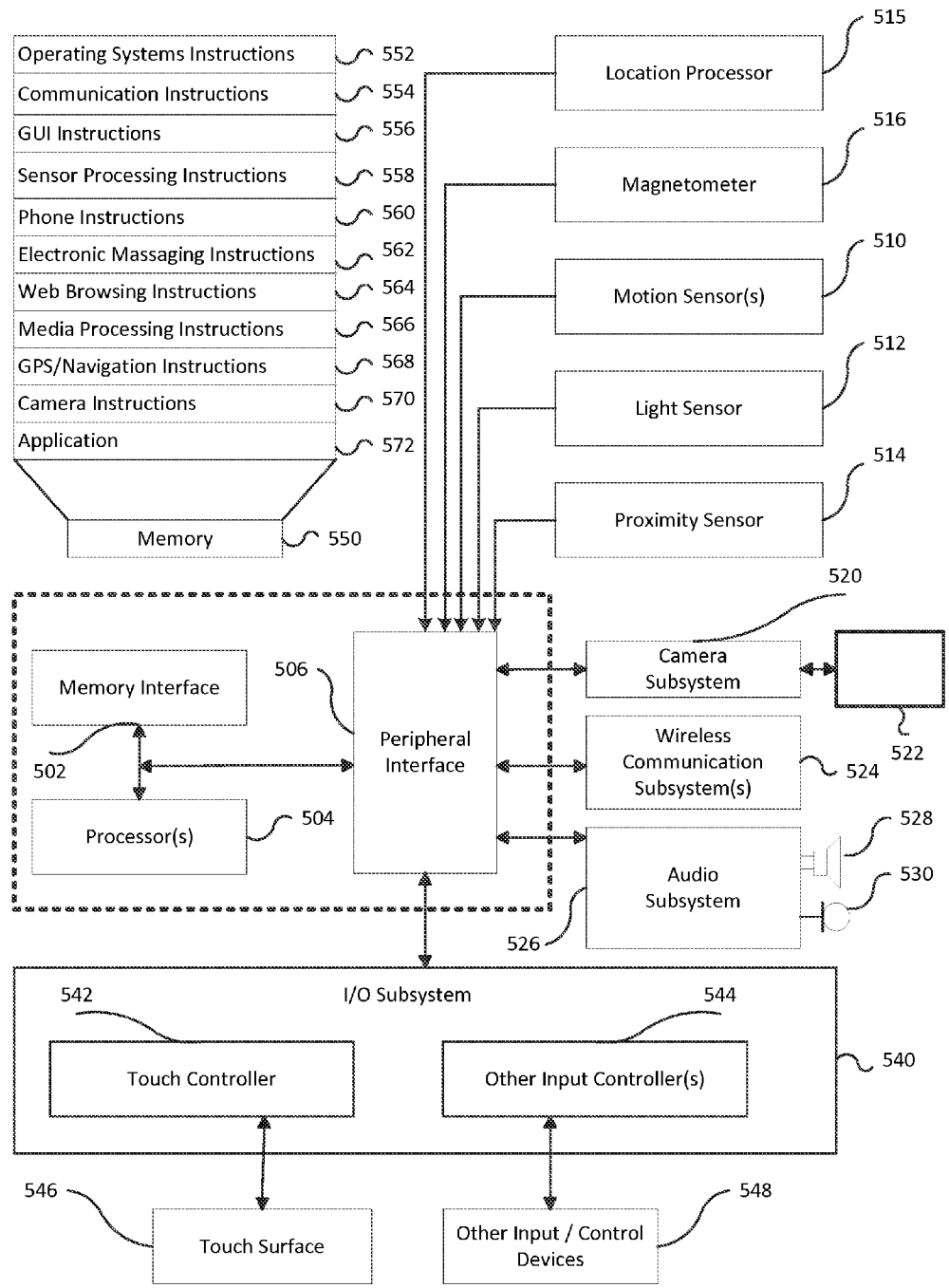
FIG. 5 illustrates a mobile device architecture that may be utilized to implement the various features and processes described herein.

FIG. 5 illustrates a mobile device architecture that may be utilized to implement the various features and processes described herein. Architecture 500 can be implemented in any number of portable devices including but not limited to smart phones, electronic tablets, and gaming devices. Architecture 500 as illustrated in FIG. 5 includes memory interface 502, processors 504, and peripheral interface 506. Memory interface 502, processors 504 and peripherals interface 506 can be separate components or can be integrated as a part of one or more integrated circuits. The various components can be coupled by one or more communication buses or signal lines.

Processors 504 as illustrated in FIG. 5 are meant to be inclusive of data processors, image processors, central processing unit, or any variety of multi-core processing devices. Any variety of sensors, external devices, and external subsystems can be coupled to peripherals interface 506 to facilitate any number of functionalities within the architecture 500 of the exemplar mobile device. For example, motion sensor 510, light sensor 512, and proximity sensor 514 can be coupled to peripherals interface 506 to facilitate orientation, lighting, and proximity functions of the mobile device. For example, light sensor 512 could be utilized to facilitate adjusting the brightness of touch surface 546. Motion sensor 510, which could be exemplified in the context of an accelerometer or gyroscope, could be utilized to detect movement and orientation of the mobile device. Display objects or media could then be presented according to a detected orientation (e.g., portrait or landscape).

Other sensors could be coupled to peripherals interface 506, such as a temperature sensor, a biometric sensor, or other sensing device to facilitate corresponding functionalities. Location processor 515 (e.g., a global positioning transceiver) can be coupled to peripherals interface 506 to allow for generation of geo-location data thereby facilitating geo-positioning. An electronic magnetometer 516 such as an integrated circuit chip could in turn be connected to peripherals interface 506 to provide data related to the direction of true magnetic North whereby the mobile device could enjoy compass or directional functionality. Camera subsystem 520 and an optical sensor 522 such as a charged coupled device (CCD) or a complementary metal-oxide semiconductor (CMOS) optical sensor can facilitate camera functions such as recording photographs and video clips.

Communication functionality can be facilitated through one or more communication subsystems 524, which may include one or more wireless communication subsystems. Wireless communication subsystems 524 can include 802.5 or Bluetooth transceivers as well as optical transceivers such as infrared. Wired communication system can include a port device such as a Universal Serial Bus (USB) port or some other wired port connection that can be used to establish a wired coupling to other computing devices such as network access devices, personal computers, printers, displays, or other processing devices capable of receiving or transmitting data. The specific design and implementation of communication subsystem 524 may depend on the communication network or medium over which the device is intended to operate. For example, a device may include wireless communication subsystem designed to operate over a global system for mobile communications (GSM) network, a GPRS network, an enhanced data GSM environment (EDGE) network, 802.5 communication networks, code division multiple access (CDMA) networks, or Bluetooth networks. Communication subsystem 524 may include hosting protocols such that the device may be configured as a base station for other wireless devices. Communication subsystems can also allow the device to synchronize with a host device using one or more protocols such as TCP/IP, HTTP, or UDP.

Audio subsystem 526 can be coupled to a speaker 528 and one or more microphones 530 to facilitate voice-enabled functions. These functions might include voice recognition, voice replication, or digital recording. Audio subsystem 526 in conjunction may also encompass traditional telephony functions.

I/O subsystem 540 may include touch controller 542 and/or other input controller(s) 544. Touch controller 542 can be coupled to a touch surface 546. Touch surface 546 and touch controller 542 may detect contact and movement or break thereof using any of a number of touch sensitivity technologies, including but not limited to capacitive, resistive, infrared, or surface acoustic wave technologies. Other proximity sensor arrays or elements for determining one or more points of contact with touch surface 546 may likewise be utilized. In one implementation, touch surface 546 can display virtual or soft buttons and a virtual keyboard, which can be used as an input/output device by the user.

Other input controllers 544 can be coupled to other input/control devices 548 such as one or more buttons, rocker switches, thumb-wheels, infrared ports, USB ports, and/or a pointer device such as a stylus. The one or more buttons (not shown) can include an up/down button for volume control of speaker 528 and/or microphone 530. In some implementations, device 500 can include the functionality of an audio and/or video playback or recording device and may include a pin connector for tethering to other devices.

Memory interface 502 can be coupled to memory 550. Memory 550 can include high-speed random access memory or non-volatile memory such as magnetic disk storage devices, optical storage devices, or flash memory. Memory 550 can store operating system 552, such as Darwin, RT5C, LINU5, UNI5, OS 5, ANDROID, WINDOWS, or an embedded operating system such as V5Works. Operating system 552 may include instructions for handling basic system services and for performing hardware dependent tasks. In some implementations, operating system 552 can include a kernel.

Memory 550 may also store communication instructions 554 to facilitate communicating with other mobile computing devices or servers. Communication instructions 554 can also be used to select an operational mode or communication medium for use by the device based on a geographic location, which could be obtained by the GPS/Navigation instructions 568. Memory 550 may include graphical user interface instructions 556 to facilitate graphic user interface processing such as the generation of an interface; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GPS/Navigation instructions 568 to facilitate GPS and navigation-related processes, camera instructions 570 to facilitate camera-related processes and functions; and instructions 572 for any other application that may be operating on or in conjunction with the mobile computing device. Memory 550 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 550 can include additional or fewer instructions. Furthermore, various functions of the mobile device may be implemented in hardware and/or in software, including in one or more signal processing and/or application specific integrated circuits.

Certain features may be implemented in a computer system that includes a back-end component, such as a data server, that includes a middleware component, such as an application server or an Internet server, or that includes a front-end component, such as a client computer having a graphical user interface or an Internet browser, or any combination of the foregoing. The components of the system can be connected by any form or medium of digital data communication such as a communication network. Some examples of communication networks include LAN, WAN and the computers and networks forming the Internet. The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an API that can define on or more parameters that are passed between a calling application and other software code such as an operating system, library routine, function that provides a service, that provides data, or that performs an operation or a computation. The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API. In some implementations, an API call can report to an application the capabilities of a device running the application, such as input capability, output capability, processing capability, power capability, and communications capability.

Users may use any number of different electronic user devices, such as general purpose computers, mobile phones, smartphones, personal digital assistants (PDAs), portable computing devices (e.g., laptop, netbook, tablets), desktop computing devices, handheld computing device, or any other type of computing device capable of communicating over communication network. User devices may also be configured to access data from other storage media, such as memory cards or disk drives as may be appropriate in the case of downloaded services. User device may include standard hardware computing components such as network and media interfaces, non-transitory computer-readable storage (memory), and processors for executing instructions that may be stored in memory.

The figures included with this disclosure are for the purpose of illustrating the invention. The figures show aspects of one or more embodiments of the invention and are examples, the figures are not meant to limit the scope of the invention. So it should be understood that the present invention is not limited to the precise arrangements and instrumentalities shown in the figures.

What is claimed is:

1. A method for providing mobile applications associated with geo-location, the method comprising:
storing information in a database regarding a plurality of applications, wherein each of the plurality of applications is associated with a defined geo-location;
receiving information regarding a plurality of settings set at a device over a user interface, wherein the plurality of settings include a selection of a plurality of application types corresponding to messages allowed to be transmitted to and automatically received by the device according to a setting of the plurality of settings when a current geo-location of the device corresponds to the defined geo-location associated with an application of the plurality of selected application types;
identifying the current geo-location of the device;
executing instructions stored in a memory, wherein the execution of the instructions by a processor identifies that the current geo-location of the device matches the defined geo-location; and
transmitting a message over a communication network interface to the device based on the identification that the current geo-location matches the defined geo-location, wherein the message is automatically received by the device based on the setting of the plurality of settings, the message including an offering by a vendor corresponding to the application of the plurality of selected application types, and the vendor is located at the matching geo-location, and wherein no message is transmitted to the device when the current geo-location of the device does not match the defined geo-location.

2. The method of claim 1, wherein the message includes at least one of a software application, an advertisement, a promotion, a coupon, and a map.

3. The method of claim 1, further comprising comparing the current location of the device to the defined geo-location associated with each of the applications, wherein the setting is an operating system setting that enables the message to be received automatically by the device based on the setting being an operating system setting.

4. The method of claim 1, wherein the setting of the plurality of settings indicates the a user preference regarding an amount of advertising that may be transmitted to the device.

5. The method of claim 1, wherein the setting of the plurality of settings indicates a user preference for at least one of a service, a purchase, a vendor, and a type of offer.

6. The method of claim 5, wherein one or more identified applications of the plurality of applications are filtered based on the indicated user preference.

7. The method of claim 6, wherein the one or more identified applications are selected based on meeting the indicated user preference.

8. A system for providing mobile applications associated with geo-location, the system comprising:
a database that stores information regarding a plurality of applications, wherein each application associated with a defined geo-location;
a display including a user interface that receives information regarding a plurality of settings, wherein the plurality of settings include a selection of a plurality of application types corresponding to messages allowed to be transmitted to and automatically received by a device according to a setting of the plurality of settings when a current geo-location of the device corresponds to the defined geo-location associated with an application of the plurality of selected application types;
a processor that executes instructions stored in a memory, wherein the execution of the instructions by the processor identifies that the current geo-location of the device matches the defined geo-location associated with the application of the plurality of selected application types; and
a communication interface that transmits a message to the device based on the identification that the current geo-location matches the defined geo-location, wherein the message is automatically received by the device based on the setting of the plurality of settings, the message including an offering by a vendor corresponding to the application of the plurality of selected application types, the vendor located at the matching geo-location, and wherein no message is transmitted to the device when the current geo-location of the device does not match the defined geo-location.

9. The system of claim 8, wherein the message includes at least one of a software application, an advertisement, a promotion, a coupon, and a map.

10. The system of claim 8, further comprising a geo-location comparer executable by the processor to compare the current location of the device to the defined geo-location associated with each of the applications, wherein the setting is an operating system setting that enables the message to be received automatically by the device based on the setting being an operating system setting.

11. The system of claim 8, wherein the setting of the plurality of settings indicates a user preference regarding an amount of advertising that may be transmitted to the device.

12. The system of claim 8, wherein the setting of the plurality of settings indicates a user preference for a type of application.

13. The system of claim 12, further comprising a match module executable by the processor to filter one or more identified applications based on the indicated user preference.

14. The system of claim 13, wherein the one or more identified applications selected based on meeting the indicated user preference.

15. A non-transitory computer-readable storage medium, having embodied thereon a program executable by a processor to perform a method for providing mobile applications associated with geo-location, the method comprising:
storing information regarding a plurality of applications, each application associated with a defined geo-location;
receiving information regarding one or more of a plurality of settings set at a device over a user interface, wherein the plurality of settings includes a selection of a plurality of application types corresponding to messages allowed to be transmitted to the device and automatically received by the device according to a setting of the plurality of settings when a current geo-location of the device corresponds to the defined geo-location associated with an application of the plurality of selected application types;
identifying the current geo-location of the device;
identifying that the current geo-location of the device matches the defined geo-location associated with the application of the plurality of selected application types; and
transmitting a message over a communication network interface to the device based on the identification that the current geo-location matches the defined geo-location, wherein the message is automatically received by the device based on the setting of the plurality of settings, the message including an offering by a vendor corresponding to the application of the plurality of selected application types, and the vendor is located at the matching geo-location, and wherein no message is transmitted to the device when the current geo-location of the device does not match the defined geo-location.

16. The non-transitory computer-readable storage medium of claim 15, wherein the message includes at least one of a software application, an advertisement, a promotion, a coupon, and a map.

17. The non-transitory computer-readable storage medium of claim 15, further comprising comparing the current location of the device to the defined geo-location associated with each of the applications, wherein the setting is an operating system setting that enables the message to be received automatically by the device based on the setting being an operating system setting.

18. The non-transitory computer-readable storage medium of claim 15, wherein the setting of the plurality of settings indicates a user preference for a type of application of the plurality of applications.

19. The non-transitory computer-readable storage medium of claim 18, wherein one or more identified applications are filtered based on the indicated user preference.

20. The non-transitory computer-readable storage medium of claim 19, wherein the one or more identified applications are selected based on meeting the indicated user preference.

* * * * *